United States Patent [19]
Derouen et al.

[11] Patent Number: 5,744,705
[45] Date of Patent: Apr. 28, 1998

[54] METHOD AND APPARATUS FOR ENGINE TESTING

[75] Inventors: Edward J. Derouen, Port Sulfur, La.; Keith J. Franovich, Hattiesburg, Miss.

[73] Assignee: Chevron U.S.A. Inc., San Francisco, Calif.

[21] Appl. No.: 512,353

[22] Filed: Aug. 7, 1995

[51] Int. Cl.⁶ ............................................. G01M 15/00
[52] U.S. Cl. .................... 73/116; 73/119 R; 33/517; 33/603; 33/605; 33/DIG. 15; 33/DIG. 17
[58] Field of Search ................... 73/37.6, 46, 47, 73/49.7, 49.8, 116, 119 R, 120; 33/517, 601, 603, 604, 605, 833, DIG. 15, DIG. 17, DIG. 21

[56] References Cited

U.S. PATENT DOCUMENTS

| | | |
|---|---|---|
| 1,758,271 | 5/1930 | Zitzmann . |
| 2,776,494 | 1/1957 | Sheppard . |
| 2,827,710 | 3/1958 | Campbell . |
| 3,889,528 | 6/1975 | Grikscheit et al. ............ 73/119 R |
| 4,143,319 | 3/1979 | Rouam ........................... 73/120 |
| 4,468,956 | 9/1984 | Merlo ............................. 73/120 |
| 4,520,660 | 6/1985 | Hitchcock ...................... 73/120 |
| 4,633,707 | 1/1987 | Haddox ........................... 73/47 |
| 4,661,695 | 4/1987 | Mori et al. ................... 73/119 R |
| 4,806,915 | 2/1989 | Rasmussen .................... 73/119 R |
| 4,879,819 | 11/1989 | Johnston et al. . |
| 4,928,400 | 5/1990 | Schuh . |
| 4,987,769 | 1/1991 | Peacock et al. ................ 73/49.7 |
| 5,258,930 | 11/1993 | Fukuyoshi et al. ............. 73/120 |
| 5,417,109 | 5/1995 | Scourtes ........................ 73/116 |

OTHER PUBLICATIONS

Mentzer, Mark A., Principles of Optical Circuit Engineering, Burle Industries, Inc., Lancaster, PA, 1990, pp. 65–85.

*Primary Examiner*—George M. Dombroske
*Assistant Examiner*—Eric S. McCall
*Attorney, Agent, or Firm*—A. S. Zavell; R. L. Freeland, Jr.; C. A. Cherichetti

[57] ABSTRACT

The invention relates to a method of, and apparatus for, determining the clearance between wear surfaces of a reciprocating piston engine and the surrounding cylindrical bore of the engine block, without need for physical contact with the piston. As particularly distinguished from the prior art, the present invention employs an energy wave source, collimated to impinge against selectable portions of the piston head either during its reciprocation, or at rest, in the so-called combustion or compression chamber between the moving piston and the engine cylinder. The energy source may be optical, electro-optical, acoustico-optical, or electromagnetic, generating continuous waves or high frequency pulses, or which are capable of reflecting such energy back to a plurality of detectors Such detectors are capable of measuring exceptionally high frequency (short wave lengths) signals to measure time (and hence distance) from the source to the piston head back to the detector. Advantage is particularly taken of multiple reflection points and multiple detectors to generate a composite signals or to separately record individual signals which are then processed to identify the location as well as the distance of any of several different friction areas relative to the source.

7 Claims, 1 Drawing Sheet

METHOD AND APPARATUS FOR ENGINE TESTING

FIELD OF THE INVENTION

The present invention relates to a method of and apparatus for, in-situ wear testing of a reciprocating piston in a cylinder and its connection to a crank shaft through a connecting rod including the piston wrist pins and both bushings of the connecting rod.

More particularly, our invention also relates to a method of and apparatus for measuring wear of an engine by precisely measuring mechanical clearances between a piston and its cylinder wall forming the combustion chamber to convert reciprocation to rotary motion of the engine crank shaft or vice versa, through a connecting rod, or alternatively, to operate the engine as a rotary power source, or as a compressor for air or gas.

The primary purpose of the invention is to permit a single operator to measure and record such clearances without disassembly of the engine and without need to mechanically or physically touch the piston head or any of its associated wear surfaces. Such measurements are accomplished by inserting a collimated energy source, such as a laser, ultrasonic, electromagnetic, or electro-optic generator into combustion chamber through a removable opening for fuel injection or an ignition access port. The collimated or waveguide device also includes at least one, and preferably a plurality of, detectors to receive energy reflected from selected portions of the piston head. The source and detector are inserted into the combustion chamber only sufficiently to assure radiation of the desired target areas of the piston head and the reflected energy is directed back to the detector, or detectors. The energy source may generate either a continuous wave, or as intermittent bursts or more preferably, as digital radiation. The bits of reflected energy are also preferably detected by a plurality of receivers, such as "microphones", distributed around the energy source, either as redundant detectors of a limited area of the piston head or for predetermine lateral movement over or around the surface of the piston head.

Desirably, the rate of vertical and/or lateral movement of the piston head may be recorded and plotted, or displayed to identify the distance and direction of movement of a portion of the piston head due to slack or wear of the cylinder bore, or the piston rings, including cracks or breaks, in the piston head or sides.

Further, slack, or lost motion, between the piston and the crank shaft during each reversal of the piston, to maintain rotation of the crank shaft, (or vice versa), is readily detected, recorded and displayed, or stored, without mechanical contact of the collimated source or detectors, with the piston head.

BACKGROUND OF THE INVENTION

It has been known for many years that wear occurs in certain portions of a reciprocating piston and its mechanical connection to a crank shaft by a connecting rod, including its upper and lower wrist pins and their respective bushings. With the prior art system, the total movement between the top of the piston and the crank shaft without rotation of the crank shaft can be measured without disassembly of each piston from its surrounding cylinder by using a probe touching the center of the piston head and extending upward through the combustion chamber and the threaded spark plug opening into such an internal combustion engine or a compressor. Such measurements are made by extending a rod through the cylinder head to contact the top of a piston (while the engine is not in operation). The rod is spring loaded to maintain contact with the piston head. The upper end of the rod is enclosed in a vapor-tight tube so that either negative or positive air pressure can be applied to the piston head. Movement of the upper end of the rod is measured to indicate directly the slack between the wrist pin and the connecting rod's upper bushing. Then with additional vacuum, the slack is measured between the lower connecting rod bushing and its connection to the crank shaft.

Such clearance, or slack, between the piston and the crank shaft is measured by positioning the piston at top-dead-center of its reciprocation within the engine cylinder. With the probe in contact to the center of the piston head, the distance that the piston rises, without lateral or rotational motion of the piston is the clearance. With application of vacuum to the combustion chamber, the piston head is able to lift the wrist pins against the upper surface of the connecting rod bushing until the slack or clearance stops motion of the piston head. The total movement of the probe is the clearance.

Similarly, by applying added vacuum the lower bushing of the connecting rod is free to rise against the underside of the crank shaft to measure the clearance therebetween.

A particular difficulty with this arrangement is the care with which the measurement must be taken to see that the probe is aligned with the center of the piston head and the reciprocating axis of the piston, as well as the need to mechanically measure the clearance of the two bushings both before the test and at the end of each measurement. Additionally, alignment of the probe is quite difficult where multi-cylinder bores of the engine and the pistons are disposed at angles to each other, such as an automobile Vee block, laterally opposed pistons, or other engine configurations.

BRIEF SUMMARY OF THE INVENTION

The invention relates to a method of and apparatus for determining the clearance between wear surfaces of a piston of a reciprocating piston engine and the surrounding cylindrical bore of the engine block, including both internal combustion engines, and a fluid compressor, without need for physical contact with the piston or precise alignment with the reciprocating axial positioning. As particularly distinguished from the prior art, the present invention employs an energy wave source, collimated to impinge against selectable portions of the piston head either during its reciprocation, or at rest, in the so-called combustion or compression chamber between the moving piston and the engine cylinder. The energy source may be optical, electro-optical, acoustico-optical, or electromagnetic, generating continuous waves or high frequency pulses, which are capable of reflecting such energy back to a plurality of detectors. Such detectors are capable of measuring exceptionally high frequency (short wave lengths) signals to measure time (and hence distance) from the source to the piston head and back to the detector. In fairly simple systems, a single reflection, as well as a single detector, may be adequate to determine piston to crank shaft distance. However, advantage is particularly taken of multiple reflection points and multiple detectors to generate a composite signals or to separately record individual signals which are then processed to identify the location as well as the distance of any of several different friction areas relative to the source. The source and associated detectors are inserted into the combustion chamber through either the spark plug or fuel injection threaded opening, or, if necessary, through a test plug threaded into the engine cylinder head. Desirably, the source and detectors are enclosed in a vapor tight tube terminating in a compatible screw thread sealing off the combustion chamber. Thus, pressure control by the tubular arrangement maintains either pressure or vacuum conditions to move the piston, either directly or indirectly, without contact. The arrangement is such that measurements can be made so as to not only change the clearance between the piston wrist pins and the connecting rod bushing being measured, and, along with the bottom bushing to crank shaft clearance, but also to measure abnormalities introduced by piston ring wear and piston wear, or damage to the combustion chamber cylinder side wall. Such measurements may also be used to determine out-of-roundness or broken or scored surfaces which may be readily detected by the same collimated energy sources, properly directed to positions to be recorded over a multiplicity of target areas and a similar multiplicity of sources. In a preferred embodiment of the invention the arrangement of the collimated source is in the form of fiber optics capable of transmitting a laser beam, for example, to a multiplicity of targets with each focused on a selected target within the combustion chamber. Since such fibers may be compacted to a diameter substantially smaller than the spark plug or injection opening into the combustion chamber, the detector elements may be equally small. Thus, each fiber is capable of being formed and directed at specific targets, or directed to different areas, during each cycle of the pistons movement.

Similarly, since the detector elements generate data that can also be optically stored, data analysis may be enhanced or suppressed, to accentuate selected portions of such data to display measurements of selected portions of the piston, combustion chamber, clearances or improper piston operation.

The arrangement is such that digital recording of the data may include either a single or a plurality of detectors, and using either a single or a plurality of sources. The digitally recorded data permits display of virtually the whole motion of the piston elements, or individual portions of the piston, during its reciprocation and their position relative to the combustion chamber or cylinder side walls. Such recordings may be made with either the piston being operated from a standing position (non-moving) or during dynamic operation of the engine, say, by blocking off fuel supply to the combustion chamber while the crank shaft is either separately rotated or the engine is driven by associated piston.

Additionally, as noted above, measurements can be made without regard to the orientation to the engine itself, whether it be upright, single piston, or angled to vertical multiple pistons, as in a V8, or horizontally disposed, and one of a multi-piston cyclone, or other configurations.

Further objects and advantages of the invention will become apparent to those skilled in the art from the following detailed description, including the drawings, which forms an integral part of the application.

PREFERRED EMBODIMENT OF THE INVENTION

Figure 1:
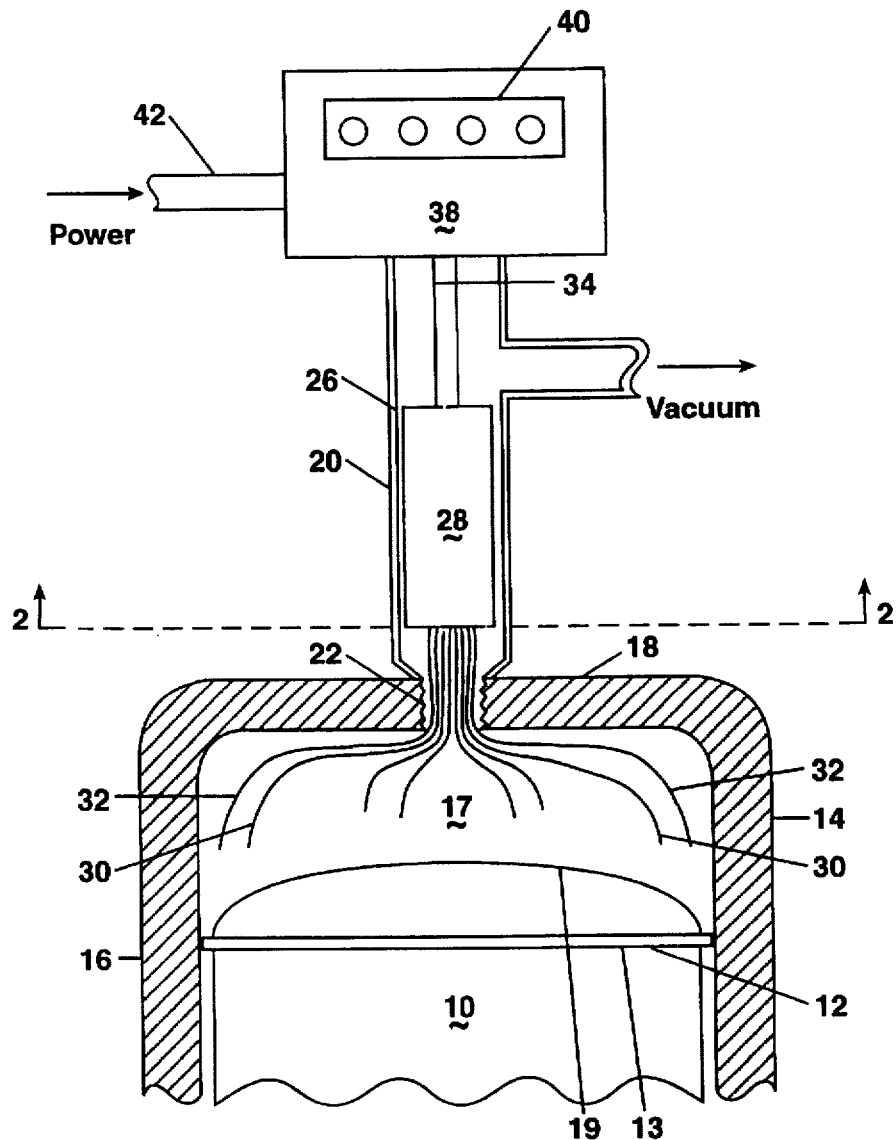
FIG. 1 is a vertical cross-sectional view, partially cut-away to illustrate the arrangement of the present invention in a single cylinder of either an internal combustion engine, or a fluid compressor.

Reference is now made to FIG. 1, which illustrates a preferred embodiment of the invention in which piston 10 is enclosed in bore 14 of engine block 16. Combustion chamber 17 is then enclosed by cylinder head 18 including a spark plug, or fuel injector (not shown) threaded into port 22 to form a vapor-tight enclosure within the space above piston head 19, to hold pressure generated by reciprocation of piston 10.

The combustion chamber is of course sealed off by piston ring 12 seated in piston ring groove 13.

Radiation of various portions of the drive system connected to piston 10, as shown in FIG. 1, includes frictional areas between cylinder wall 14 and rings 12. As is well understood in the prior art, the lower end of the piston 10 is connected to a connecting rod, in a convention way, through wrist pins (not shown) at the lower end of piston 10. The wrist pins in turn are connected to the upper bushing of the connector rod and the lower bushing at the other end of the connector rod connected to the crank shaft. These elements are not shown since the technology of measuring movement of those parts has been shown in the prior art. However, such measurements require physical contact with piston head 19 by a probe that must remain in contact with the piston head while a vacuum lifts the piston.

As particularly distinguished from that arrangement, the present invention employs a source of electromagnetic, optical, acoustic energies, or combinations thereof such as optical-acoustic, or optical magnetic energy. In the present embodiment, source 28 is positioned generally in line with threaded opening 22 and within enclosed tube 20, which permits vacuum to be drawn through the annular space 26 around the source or generator 28. This applies vacuum, if desired, to the top of piston 10. With the arrangement shown, energy from source 28 is delivered by a collimated high frequency energy that is directed by fibers 30 to the space or "target" between the cylinder wall 14 and piston head 19. Similarly, reflected energy from a multiplicity of detector fibers 32, or optical collimated fibers may be either directed to a single target area, or a multiplicity of detector fibers 32 may be directed to the same target. The energy so detected and the frequency of the generated energy, are recorded in computer 38 for analysis and subsequent display as indicated by display unit 40. Energy for generation of optical, acoustic, opto-acoustic or electromagnetic collimated source is generated by electrical power source 42.

Figure 2:
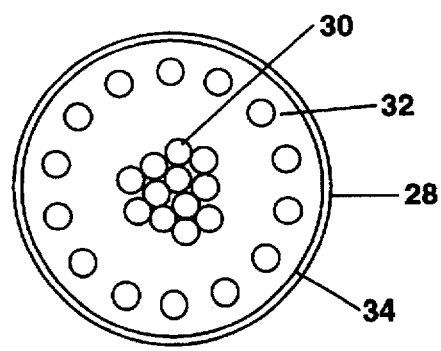
FIG. 2 is a cross-sectional plan view, taken in the direction of arrows 2—2 in FIG. 1, showing the distribution of the optical or sonic collimated wave sources and the reflected energy detectors.

The arrangement of FIG. 2 particularly shows distribution of the collimated energy from source 28 is through the central fibers 30. Echo detector fibers 32 pass upwardly to the computer 38 by way of cable 34, which also transmit the beginning and the ending of each timing period generated by each burst, contacting a selected portion of the pulses, or continuous waves, which are compared to the echo signals generated by the detector fibers 32 to measure thereby the wear areas within and around the combustion chamber and piston 10.

While the details of the circuitry for generating the various forms of optical energy, including as noted above, acousto-optics, electro-optics and various other forms of generating high frequency energy up to wave lengths in the range of $10^{15}$ cycles per second as is now possible in optical systems.

The fundamental principles of how such optical energy can be converted to electrical, or mechanical energy is well recognized in the advanced technology known as "optical engineering." For details for such circuitry and the engineering applications of using optico-mechanical devices as well as optical fibers for transmission and reception, and newer applications of optico-electronic circuits, for transfer of energy and calculation in the optical frequency spectrum, are disclosed in a series of books, known as "Optical Engineering" edited by Professor Brian I. Thompson, Provost, University of Rochester, Rochester, N.Y. More specifically, reference is herewith made to the 26th book in this series which was written by Mark A. Mentzer, Burle Industries, Inc., Lancaster, Pa., published by Marcel Dekker, Inc., NY and Basel, entitled "Principles of Optical Circuit Engineering" copyright 1990.

Various modifications and changes will become apparent to those skilled in the art from the present application. All such modifications or changes coming within scope of the appended claims are intended to be included therein.

What is claimed is:

1. A measuring device for determining clearances between a piston of a reciprocating engine and interconnected mechanical driver elements including wrist pins, a connecting rod, crank shaft bearings, piston rings, and the cylinder wall around said piston at any selected position of said piston over a full revolution of said crank shaft without disassembly of said engine which comprises:

(a) a collimated wave source for directly irradiating a selectable area on the piston head during reciprocation of said piston within the enclosed volume of the cylinder wall formed in an engine block;

(b) said collimated wave source being supported within an impervious chamber having one end threadably sealable to said engine block to form an auxiliary volume integral with the compression chamber formed by the head space between said piston head and said engine block;

(c) said chamber additionally including means for modifying pressure in said compression chamber sufficient to reciprocate said piston head relative to any initial position thereof in said cylinder;

(d) detection means for measuring and recording a distance of movement of a selected portion of a piston head relative to a reference marker on said engine block during movement of said piston and an interconnected wrist pin, interconnected to a said connecting rod, crank shaft, and crank shaft bearings;

(e) means for displaying the linear distances for movement of said piston head relative to said reference marker to indicate the displacement distances for movement of each element over any portion of a full cycle of said piston; and (f) wherein said collimated wave source is a laser beam generating an optical frequency responding to the speed of rotation of said crank shaft, said detection means includes digital recording means, and said display means indicates the vertical movement of said selected portion of said piston head over a given time interval.

2. Apparatus in accordance with claim 1 wherein said optical frequency is detected at a plurality of spaced apart detectors around the circumference of said cylinder.

3. Apparatus in accordance with claim 1 wherein the engine is an internal combustion engine.

4. Apparatus in accordance with claim 1 wherein the engine is a reciprocating gas compression engine.

5. A method of measuring a plurality of clearances between wear surfaces of a piston reciprocating in a cylinder of an engine, including driven or driving elements and their interconnections to a connecting rod, a crank shaft, piston rings and cylinder walls without diassembly of said engine which comprises:

(a) suspending a collimated wave source to direct irradiation therefrom to a selectable area above the piston head during reciprocation of said piston to irradiate the area between the cylinder wall formed in an engine block and over any portion of said piston head;

(b) further, suspension of said collimated wave source being supported within an impervious chamber having one end threadably sealable to said engine block to form an auxiliary volume integral with the compression chamber formed by the space between said piston head and said engine block;

(c) modifying the atmospheric pressure in said compression chamber sufficient to reciprocate said piston head relative to any initial position of said piston in said cylinder;

(d) detecting and recording a time and distance of movement of said selected portion of said cylinder head relative to the initial position of said piston relative to said engine block during movement of said piston and the interconnected wrist pin, connecting rod, crank shaft, and crank shaft bearing, by measuring a time for energy to reflect from said selected area to a fixed detector above said area, and (e) displaying linear distances and the time for movement of said piston head relative to said fixed detector to indicate the displacement distances and the time for movement of each selected area over any portion of a fully cycle of said piston during said reciprocation.

6. In a reciprocation engine having at least one cylinder enclosing a piston in a conventional cylinder block forming a combustion or compression chamber, said piston including a piston ring, and a wrist pin for connection to a connecting rod having a bearing connected to one end of a driven or driving crank shaft, and apparatus for measuring wear between said piston and any of the friction surfaces at any position over 360 degrees of rotation of said crank shaft rotation without disassembly of said engine the improvement which comprises:

(a) a collimated wave source for directly irradiating a selectable area on the piston head during reciprocation of said piston within the enclosed volume of the cylinder wall formed in an engine block;

(b) said collimated wave source being supported within an impervious chamber having one end threadably sealable to said engine block to form an auxiliary volume integral with the compression chamber formed by the head space between said piston head and said engine block;

(c) said chamber additionally including means for modifying pressure in said compression chamber sufficient to reciprocate said piston head relative to any initial position thereof in said cylinder;

(d) detection means for measuring and recording the time and distance of movement of said selected portion of said cylinder head relative to a reference marker on said engine block during movement of said piston and the interconnected wrist pin, connecting rod, crank shaft, and crank shaft bearings; and (e) means for displaying the linear distances and time for movement of said piston head relative to said reference marker to indicate the displacement distances and time for movement of each element over any portion of a full cycle of said piston.

7. A measuring device for determining clearances between a piston of a reciprocating engine and interconnected mechanical driver elements including wrist pins, a connecting rod, crank shaft bearings, piston rings, and the cylinder wall around said piston at any selected position of said piston over a full revolution of said crank shaft without disassembly of said engine which comprises:

(a) a collimated wave source for directly irradiating a selectable area on the piston head during reciprocation of said piston within the enclosed volume of the cylinder wall formed in an engine block;

(b) said collimated wave source being supported within an impervious chamber having one end threadably sealable to said engine block to form an auxiliary volume integral with the compression chamber formed by the head space between said piston head and said engine block;

(c) said chamber additionally including means for modifying pressure in said compression chamber sufficient to reciprocate said piston head relative to any initial position thereof in said cylinder;

(d) detection means for measuring and recording a distance of movement of a selected portion of a piston head relative to a reference marker on said engine block during movement of said piston and an interconnected wrist pin, interconnected to a said connecting rod, crank shaft, and crank shaft bearings;

(e) means for displaying the linear distances for movement of said piston head relative to said reference marker to indicate the displacement distances for movement of each element over any portion of a full cycle of said piston;

(f) wherein said collimated wave source is a sonic wave generator having a narrow frequency band width, and said measuring means is at least one microphone; and (g) wherein said measuring means is a plurality of microphones spaced circumferentially apart around said selected portion of said piston head and said display means includes means for indicating radial displacement of said piston head during reciprocation of said piston relative to the cylinder wall.

* * * * *